(12) United States Patent
Brimhall et al.

(10) Patent No.: US 11,830,126 B2
(45) Date of Patent: Nov. 28, 2023

(54) ACCURATE REPRESENTATION OF CAMERA FIELD OF VIEW IN TWO-DIMENSIONAL MAPPING APPLICATIONS

(71) Applicant: MOTOROLA SOLUTIONS, INC., Chicago, IL (US)

(72) Inventors: Brent Brimhall, Dallas, TX (US); Qin Hu, Surrey (CA)

(73) Assignee: MOTOROLA SOLUTIONS, INC., Chicago, IL (US)

(*) Notice: Subject to any disclaimer, the term of this patent is extended or adjusted under 35 U.S.C. 154(b) by 175 days.

(21) Appl. No.: 17/451,101

(22) Filed: Oct. 15, 2021

(65) Prior Publication Data

US 2023/0119771 A1 Apr. 20, 2023

(51) Int. Cl.
*G06T 15/10* (2011.01)
*H04N 23/62* (2023.01)
*H04N 7/18* (2006.01)

(52) U.S. Cl.
CPC ............. *G06T 15/10* (2013.01); *H04N 23/62* (2023.01); *G06T 2200/24* (2013.01); *G06T 2210/21* (2013.01); *H04N 7/18* (2013.01)

(58) Field of Classification Search
CPC .......... H04N 7/18; H04N 23/62; G06T 15/10; G06T 2210/21; G06T 19/00; G06T 2200/24; G06T 17/05
See application file for complete search history.

(56) References Cited

U.S. PATENT DOCUMENTS

| 10,366,523 B2 | 7/2019 | Chen et al. | |
| 10,896,549 B1* | 1/2021 | Powers | G06T 15/205 |
| 10,976,179 B1* | 4/2021 | Norton | G06V 20/10 |

(Continued)

OTHER PUBLICATIONS

Snavely, N., Seitz, S. M., & Szeliski, R. (2006). Photo tourism: exploring photo collections in 3D. In ACM siggraph 2006 papers (pp. 835-846). (Year: 2006).*

(Continued)

*Primary Examiner* — Phi Hoang
(74) *Attorney, Agent, or Firm* — Michael Best & Friedrich LLP

(57) ABSTRACT

Systems and methods for accurate representation of camera field of view in two-dimensional mapping applications. One example system includes a transceiver, a display for displaying a graphical user interface, and an electronic processor. The electronic processor is configured to provide, on the graphical user interface, a two-dimensional map representing the real-world area and determine a plurality of characteristics for the camera. The electronic processor is configured to generate a three-dimensional model for the field of view based on the plurality of characteristics. The electronic processor is configured to determine an intersection plane for the three-dimensional model and generate, based on the intersection plane, a two-dimensional slice of the three-dimensional model, the two-dimensional slice being representative of the field of view within the area. The electronic processor is configured to generate a first graphical representation of the two-dimensional slice and present the first graphical representation on the two-dimensional map.

14 Claims, 9 Drawing Sheets

(56) References Cited

U.S. PATENT DOCUMENTS

| | | | | |
|---|---|---|---|---|
| 2013/0179841 A1* | 7/2013 | Mutton | ................ | G06T 19/003 |
| | | | | 715/850 |
| 2019/0287164 A1* | 9/2019 | Eraker | ............... | G06Q 30/0623 |
| 2021/0256758 A1* | 8/2021 | McCarty | ................... | G06T 7/75 |

OTHER PUBLICATIONS

Avigilon, "Working with Maps" from Avigilon Control Center™ Standard Client User Guide Version 6.14 from <https://assets.avigilon.com/file_library/pdf/acc6/avigilon-acc6.14-client-standard-en-rev3.pdf>, pp. 115-118, 2019. (Year: 2019).*

Avigilon, " Maps," from Avigilon Control Center Client User Guide Version 5.0 Standard, <https://ecl-ips.com/wp-content/uploads/2013/12/avigilon-control-center-5-0-standard-client-user-guide.pdf> pp. 93-96, dated 2013.

* cited by examiner

ACCURATE REPRESENTATION OF CAMERA FIELD OF VIEW IN TWO-DIMENSIONAL MAPPING APPLICATIONS

BACKGROUND OF THE INVENTION

Cameras and other video capture devices are deployed by property owners, government agencies, and others for security, investigation, coordinating public safety responses, traffic monitoring, weather monitoring, and for other purposes. A camera's ability to capture images is limited by, among other things, its resolution, frame rate, night vision capability, its location, and its field of view. The limitations of the cameras are often taken into account when planning the deployment of such cameras, when operating systems to monitor video feeds from such cameras, and when using automated systems to detect objects and activity in video feeds from such cameras.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
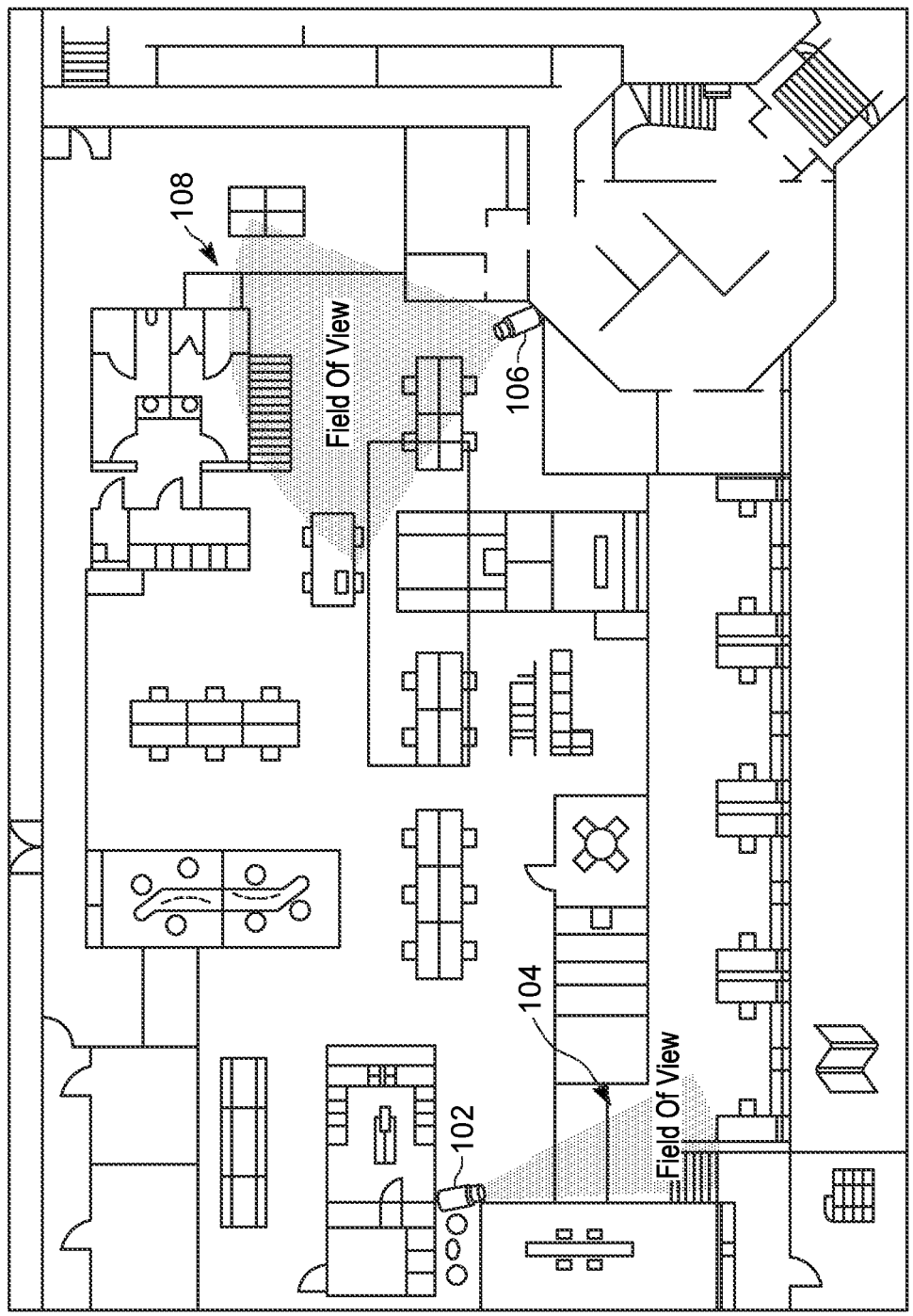
FIG. 1 illustrates a known display for planning the deployment of cameras.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

In some instances, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Cameras and other video capture devices are used to monitor real-world areas to, among other things, protect property and persons. Each camera deployed in an area has a limited field of view that determines what portions of the area will be visible in images captured by the camera. FIG. 1 illustrates a known system for planning a security camera deployment (or for viewing an existing deployment). As illustrated in FIG. 1, a map 100 depicts an area in which two cameras 102 and 106 are deployed having respective fields of view 104 and 108. FIG. 1 illustrates a top down two-dimensional view of the map 100. Current systems illustrate cameras with standard two-dimensional depictions of their fields of view (for example, FIG. 1 uses "pie slices"). A user using a mapping application to plan a security system plans the system based on these standard field of view depictions. Similarly, a user operating software to monitor an active security system may reference these standard field of view depictions when determining monitoring a video feed from a camera.

However, these known depictions do not take into account unique features of the terrain in which the camera is deployed, some characteristics of the camera (for example, the height at which it is deployed), or the type of objects for which the system monitors. Additionally, the known two-dimensional depictions provide no indication of any dead zones that may occur (for example, an area under and close to a camera, which is outside the camera's field of view. Furthermore, the known depictions do not apply in the case where a camera is looking at the horizon or above the horizon. These depictions are therefore inaccurate and may lead to inefficient or ineffective deployment of cameras. The deployment of attendant computing and network infrastructure may also be inefficient or ineffective. In addition, use of such depictions in manual or automated monitoring systems can lead to faulty assessments of security when the video feeds are monitored or analyzed, which in turn can lead to the misuse of computing, networking, public safety, and other resources.

To address, among other things, these problems, systems and methods are provided herein for accurately representing, on a two-dimensional map, a field of view for a camera. Among other things, embodiments provided herein utilize a three-dimensional model of the field of view and knowledge of the area in which the camera is deployed to produce an accurate two-dimensional representation of the field of view. Embodiments presented herein also detect and depict dead zones for cameras. The embodiments provided herein provide an accurate representations of cameras fields of view, which in turn ensures that a camera system provides adequate coverage and meets image quality standards. Using such embodiments, more efficient and effective security camera systems can be planned and deployed.

Additionally, using such embodiments, personnel monitoring a deployed security system can use the more accurate field of view depictions to better understand situations in the area being monitored. This, in turn, can reduce false negative and positive indications, reducing the misuse of resources and leading to more efficient use of communications networks and computing resources and improving the response to any incidents. Such embodiments also provide more efficient use of communications infrastructure by reducing the time and tasks necessary to deploy or operate camera systems.

One example embodiment provides a system for accurately representing a field of view of a camera within a real-world area. The system includes a transceiver, a display for displaying a graphical user interface, and an electronic processor communicatively coupled to the transceiver and the display. The electronic processor is configured to provide, on the graphical user interface, a two-dimensional map representing the real-world area. The electronic processor is configured to determine a plurality of characteristics for the camera. The electronic processor is configured to generate a three-dimensional model for the field of view based on the plurality of characteristics. The electronic processor is configured to determine an intersection plane for the three-dimensional model. The electronic processor is configured to generate, based on the intersection plane, a two-dimensional slice of the three-dimensional model, the two-dimensional slice being representative of the field of view within the area. The electronic processor is configured to generate a first graphical representation of the two-dimensional slice. The electronic processor is configured to present the first graphical representation on the two-dimensional map.

Another example embodiment provides a method for accurately representing a field of view of a camera within a real-world area. The method includes providing, on a graphical user interface, a two-dimensional map representing the real-world area. The method includes determining, with an electronic processor, a plurality of characteristics for the camera. The method includes generating, with the electronic processor, a three-dimensional model for the field of view based on the plurality of characteristics. The method includes determining with the electronic processor, an intersection plane for the three-dimensional model. The method includes generating, with the electronic processor, based on the intersection plane, a two-dimensional slice of the three-dimensional model, the two-dimensional slice being representative of the field of view within the area. The method includes generating, with the electronic processor, a first graphical representation of the two-dimensional slice. The method includes presenting the first graphical representation on the two-dimensional map.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be understood that although certain figures presented herein illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 2:
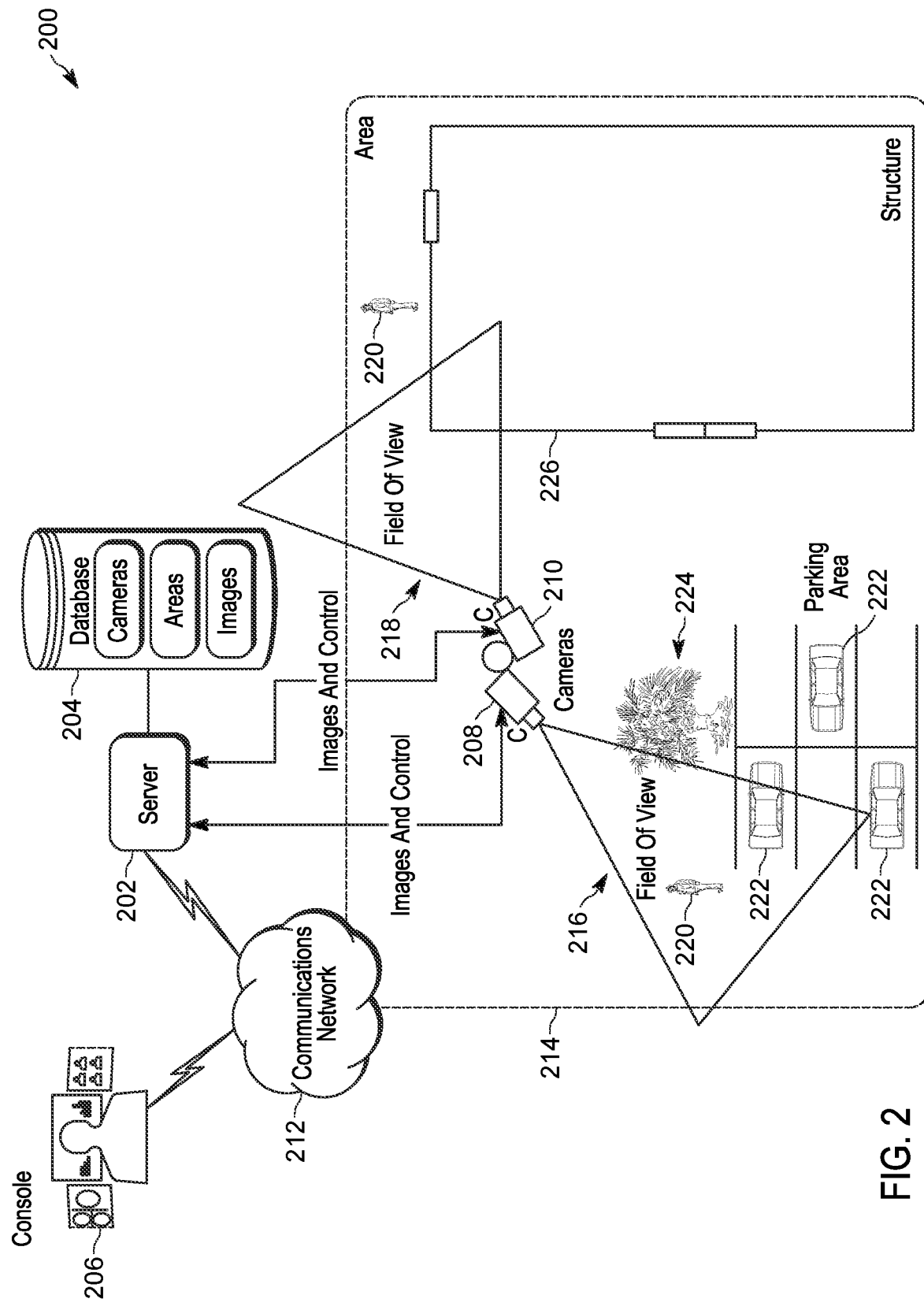
FIG. 2 illustrates a system for providing the accurate representation of a camera field of view in a two-dimensional mapping application in accordance with some embodiments.

FIG. 2 is a diagram of one example embodiment of a system 200, which is configured to, among other things, accurately represent in a two-dimensional mapping interface the fields of view of one or more cameras deployed within a real-world area. In the example illustrated, the system 200 includes a server 202, a database 204, a console 206, a first camera 208, and a second camera 210.

The server 202, database 204, console 206, first camera 208, and second camera 210 are communicatively coupled to one another. In the illustrated embodiment, they are coupled via a communications network 212. The communications network 212 is a communications network including wireless connections, wired connections, or combinations of both. The communications network 212 may be implemented using various local and wide area networks, for example, a Bluetooth™ network, a Wi-Fi network), the Internet, a cellular data network, a Long Term Evolution (LTE) network, a 4G network, a 5G network, or combinations or derivatives thereof.

As described herein, the server 202 and the database 204 operate to, among other things, provide mapping applications, which display maps (for example, of the area 214) that include graphical representations of cameras (and the cameras' respective fields of view) deployed to monitor the areas depicted in the maps.

Figure 3:
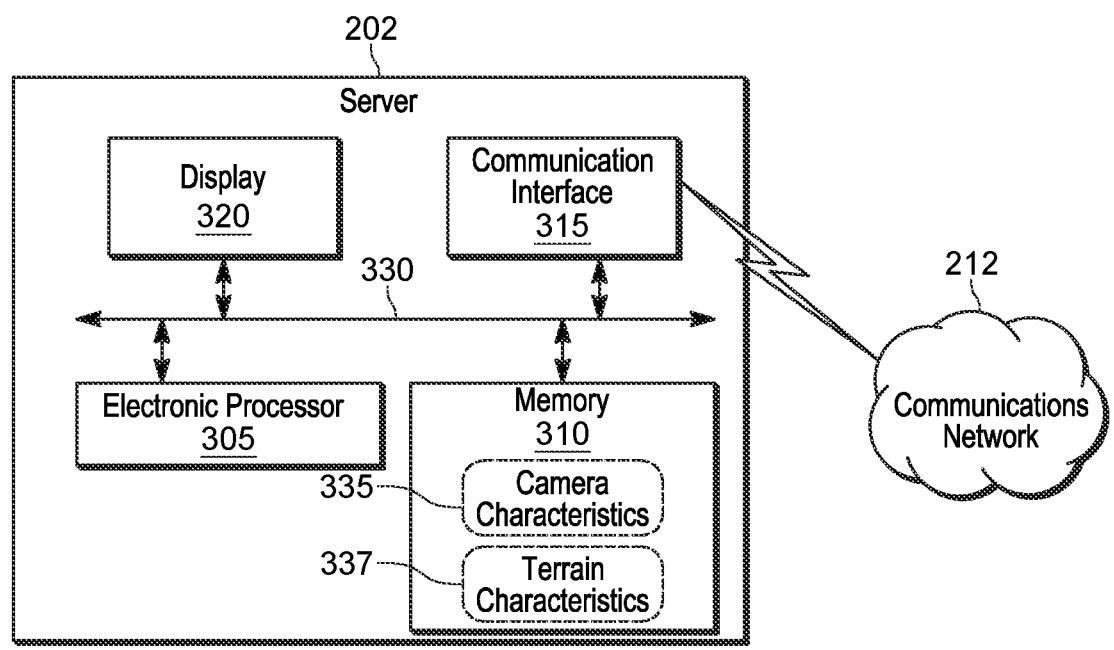
FIG. 3 is a diagram of a server of the system of FIG. 2 in accordance with some embodiments.

The server 202 is described more particularly with respect to FIG. 3. In the example provided, the server 202 includes an electronic processor 305, a memory 310, a communication interface 315, and a display 320. The illustrated components, along with other various modules and components (not shown) are coupled to each other by or through one or more control or data buses (for example, a communication bus 330) that enable communication therebetween. The use of control and data buses for the interconnection between and exchange of information among the various modules and components would be apparent to a person skilled in the art in view of the description provided herein.

The electronic processor 305 obtains and provides information (for example, from the memory 310 and/or the communication interface 315), and processes the information by executing one or more software instructions or modules, capable of being stored, for example, in a random access memory ("RAM") area of the memory 310 or a read only memory ("ROM") of the memory 310 or another non-transitory computer readable medium (not shown). The software can include firmware, one or more applications, program data, filters, rules, one or more program modules, and other executable instructions. The electronic processor 305 is configured to retrieve from the memory 310 and execute, among other things, software related to the methods described herein.

The memory 310 can include one or more non-transitory computer-readable media and includes a program storage area and a data storage area. The program storage area and the data storage area can include combinations of different types of memory, as described herein. In the embodiment illustrated, the memory 310 stores, among other things, data relating to camera characteristics 335 and terrain characteristics 337 (both described in detail herein).

The communication interface 315 is configured to receive input and to provide system output. The communication interface 315 obtains information and signals from, and provides information and signals to, (for example, over one or more wired and/or wireless connections) devices both internal and external to the server 202. The communication interface 315 may include a wireless transmitter or transceiver for wirelessly communicating over the communications network 212. Alternatively, or in addition to a wireless transmitter or transceiver, the communication interface 315 may include a port for receiving a cable, such as an Ethernet cable, for communicating over the communications network 212 or a dedicated wired connection. It should be understood that, in some embodiments, the server 202 communicates with other devices through one or more intermediary devices, such as routers, gateways, relays, and the like.

The display 320 is a suitable display such as, for example, a liquid crystal display (LCD) touch screen, or an organic light-emitting diode (OLED) touch screen. In some embodiments, the server 202 implements a graphical user interface (GUI) (for example, generated by the electronic processor 305, from instructions and data stored in the memory 310), and presented on the display 320), that enables a user to interact with the server 202. In some embodiments, the server 202 enables display remotely, for example, using a display (configured similarly to the display 320) of the console 206. In some embodiments, the server 202 operates using, among other things, augmented reality technology, where video streams are displayed (for example, on the display 320 or the console 206) with text, graphics, or graphical user interface elements superimposed on or otherwise combined with the video stream's images.

In some embodiments, the server 202 includes a video analytics engine (for example, stored in the memory 310). A video analytics engine analyzes images (for example, images captured by the first camera 208 and the second camera 210) to, among other things, identify and detect objects within the images, for example, by implementing one or more object classifiers. In some embodiments, the electronic processor 305 is configured to operate the video analytics engine to detect the presence, absence, location, movement, and the like of one or more target objects by analyzing the captured images received from the first camera 208 and the second camera 210.

Returning to FIG. 2, the server 202 is communicatively coupled to, and writes data to and from, the database 204. In the illustrated embodiment, the database 204 is a database housed on a suitable database server communicatively coupled to and accessible by the server 202. In some embodiments, the database 204 is part of a cloud-based database system (for example, a data warehouse) external to the system 200 and accessible by the server 202 over one or more wired or wireless networks. In some embodiments, all or part of the database 204 is locally stored on the server 202.

In some embodiments, the server 202 and the database 204 are part of a computer-aided dispatch system. In some embodiments, the server 202 and the database 204 are part of a governmental or private security and access control system. As illustrated in FIG. 2, in some embodiments the database 204 electronically stores camera data, area data, and image data.

Examples of camera data include data on the types and locations of cameras (for example, security or surveillance cameras) deployed and monitored using embodiments of the system 200. Camera data also includes data on the characteristics of the cameras, for example, a pan value, a tilt value, a height relative to a ground level (at which the camera is deployed), an aspect ratio, a focal length, a resolution, a storage capacity, a lens type, and the like.

Area data includes data describing the location and characteristics of a real-world area (for example, the area 214 illustrated in FIG. 2). Examples area data include an area identifier (for example, a unique alphanumeric identifier), a location, a boundary, and information relating to the terrain of the area (for example, topographic data and ground/floor levels for all of or portions of the area). Terrain data may also include data describing objects within the area (for example, the size, shape, and location of the objects). For example, the area 214 includes a tree 224 and a structure 226.

Area data may also include target object data. As used herein, the term "target object" refers to an object or particular type of object, which it is desirable to capture images of with the cameras deployed in an area. The presence, absence, or movement of target objects may be monitored by the system 200 (for example, when used by public safety personnel). Target objects may be artificial (for example, the vehicles 222, structures, and the like) or natural (for example, animals, the human beings 220, and the like). In one example, such as security cameras deployed in an office building, the target objects may be human beings. In another example, a target object may be a vehicle (for example, when monitoring a street or a parking garage entrance). In another example, the target object may be a door, the opening and closing of which is to be automatically detected. In another example, the target object may be an automated teller machine (ATM), the sudden absence of which is being monitored for in the captured images. As described herein, the electronic processor 305 may take into account specified target objects when generating a graphical representation of the field of view for a camera. Target object data may include height, width, shape, colors, and an expected location for a particular target object or a type or class of target objects. Target object dimensions may be specified in absolute terms, relative terms, as an average or median, as a range, or using combinations of the foregoing.

Image data includes images captured by the first camera 208 and the second camera 210 and transmitted to the server 202 and/or the console 206. The terms "image" and "images," as used herein, refer to one or more digital images captured by the first camera 208 and the second camera 210, or processed by the electronic processor 305, or displayed on the display 320. Further, the terms "image" and "images," as used herein, may refer to still images or sequences of images (that is, a video stream).

The console 206 is a computer terminal operated by an operator. In some embodiments, the console 206 is a computer-aided dispatch terminal for a public safety organization and is operated by a dispatcher. In some embodiments the console 206 is a security monitoring terminal for a public or private organization and is operated by security personnel. In some embodiments, the console 206 is a computer that includes an electronic processor (for example, a microprocessor, or other electronic controller), a memory, a network interface, and other various modules coupled directly, by one or more control or data buses, or a combination thereof. The memory may include read-only memory, random access memory, other non-transitory computer-readable media, or a combination thereof. In one example, the electronic processor is configured to retrieve instructions and data from the memory and execute, for example, functions as described herein. The console 206 sends and receives data over the communications network 212 using the network interface. While the console 206 is described herein with reference to a single operator, in some embodiments, the console 206 includes a plurality of consoles 206 that are each operated by one or more operators.

Each of the first camera 208 and the second camera 210 is an image capture device for capturing images and video streams, including a portion or the entirety of the area 214, by, for example, sensing light in at least the visible spectrum. The first camera 208 and the second camera 210 electronically communicate (for example, via the communications network 212) captured images and video streams to the server 202 for storage, processing, and display. Each of the first camera 208 and the second camera 210 may be a surveillance camera, a traffic camera, or another suitable image capture device that records images of the area 214 from a fixed position. In some embodiments, one or both of the first camera 208 and the second camera 210 may be a stereoscopic camera, or otherwise capable of capturing three-dimensional information about area 214. In some embodiments, three-dimensional information may be captured using radar sensors or infrared ranging sensors (not shown).

As illustrated in FIG. 2, the first camera 208 and the second camera 210 are deployed within the area 214 to capture images (for example, video streams) used to remotely monitor the area 214 (for example, using the console 206). In some embodiments, the server 202 and/or the console 206 includes software and hardware (for example, video processors and object classifier algorithms) to electronically detect and classify objects within images and video streams captured by the first camera 208 and the second camera 210.

A camera's ability to capture images is limited by, among other things, its resolution, frame rate, night vision capability, its location, and its field of view. For example, the first camera 208 has a field of view 216 and the second camera 210 has a field of view 218. The fields of view 216, 218 are illustrated in FIG. 2 two-dimensionally and only in terms of their respective angles and focal lengths. However, the first camera 208 and the second camera 210 exist three dimensionally, and thus their fields of view exist in three dimensions. The depictions of the fields of view illustrated in FIG. 2 differ from the real-world fields of view for the first camera 208 and the second camera 210 and do not accurately reflect the fields of view of the images captured by the cameras. Furthermore, the depictions may not take into account objects that obscure the fields of view. For example, the tree 224 obstructs the field of view 216 and the structure 226 obstructs the field of view 218.

Operators of security systems and dispatchers coordinating a public safety response monitor video feeds covering particular areas. Some automated security systems provide alerts based on motion or target detection in a particular area. Personnel planning the deployment of a security system seek to deploy cameras, which will provide adequate coverage of an area to be monitored. All rely on correct understandings of the fields of view for cameras that are or will be providing images.

Figure 4:
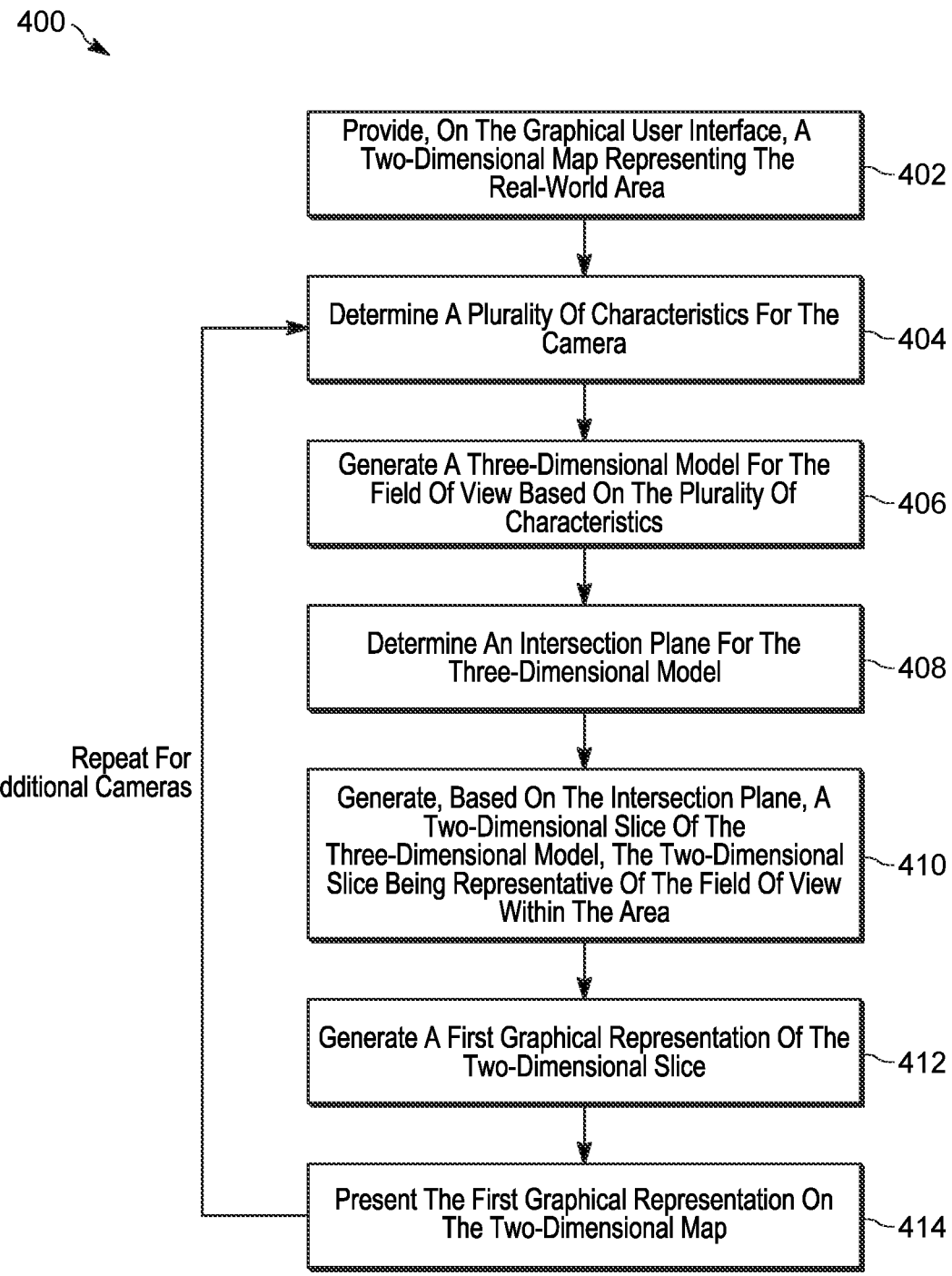
FIG. 4 is a flowchart illustrating a method for accurately representing a camera field of view in a two-dimensional mapping application in accordance with some embodiments.

Accordingly, FIG. 4 illustrates an example method 400 for accurately representing a field of view of a camera within a real-world area, the system comprising. Although the method 400 is described in conjunction with the system 200 as described herein, the method 400 could be used with other systems and devices. In addition, the method 400 may be modified or performed differently than the specific example provided.

As an example, the method 400 is described as being performed by the server 202 and, in particular, the electronic processor 305. However, it should be understood that, in some embodiments, portions of the method 400 may be performed by other devices, including for example, the console 206. Additional electronic processors may also be included in the console 206 and/or server 202 that perform all or a portion of the method 400. For ease of description, the method 400 is described in terms of a single map and a single camera. However, the method 400 may be applied to multiple maps, each including multiple cameras.

The method 400 is executed in conjunction with software that provides a graphical user interface, for example, the Aviglion Control Center™ or System Design Tool™ software (provided by Motorola Solutions®). The graphical user interface is used to, among other things, provide mapping applications. In some embodiments, the system 200 provides mapping applications, which are used to plan the deployment of cameras within an area. In some embodiments, the system 200 provides mapping applications, which are used in concert with or as part of other systems to monitor video feeds from already-deployed cameras.

Figure 5:
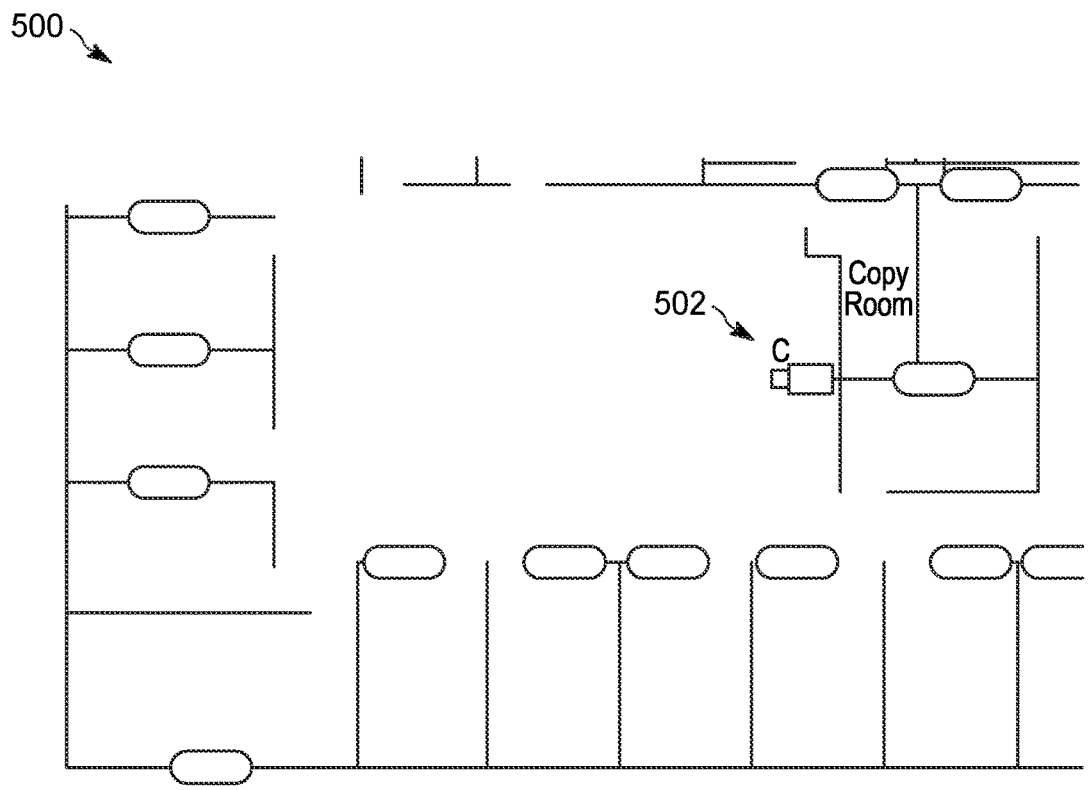
FIG. 5 illustrates an example graphical user interface generated by the system of FIG. 2 in accordance with some embodiments.

At block 402, the electronic processor 305 provides on the graphical user interface, a two-dimensional map representing a real-world area. The electronic processor 305 may directly (for example, by controlling a display electronically coupled to or incorporated into the server 202) or indirectly (for example, by communicating appropriate commands and/or data to another device) cause the display of the graphical user interface. For example, as illustrated in FIG. 5, a two-dimensional map 500, which represents a real-world office space, is displayed. In the example, illustrated, the map 500 also includes a depiction of a camera 502, which can be or is used to monitor the area represented by the map 500. As noted, whether the area is being monitored or a security system is being planned for the area, it is desirable to have an accurate understanding of what portion of the area the camera is capable of capturing in images.

At block 404, the electronic processor 305 determines a plurality of characteristics for the camera 502. In one example, the electronic processor 305 retrieves characteristics corresponding to the camera from the database 204. In some embodiments, the camera characteristics are input by a user of the system 200 (for example, using the console 206). In some embodiments, a combination of approaches is used. Camera characteristics include a location within the area, a pan value, a tilt value, a height relative to a ground level of the area, an aspect ratio, and a focal length.

Figure 6:
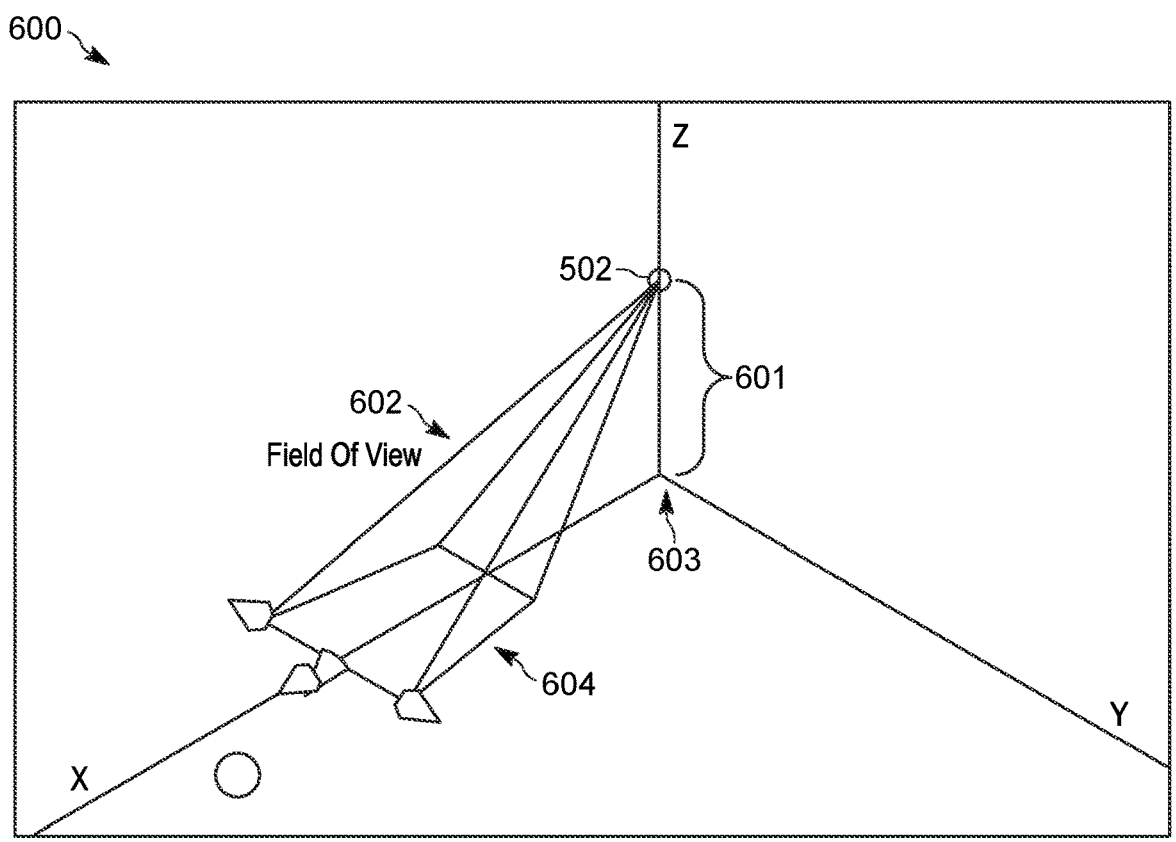
FIG. 6 is a diagram illustrating aspects of the execution of the method of FIG. 4 in accordance with some embodiments.

At block 406, the electronic processor 305 generates a three-dimensional model 602 for the field of view based on the plurality of characteristics. The three-dimensional model 602 mathematically describes the size and shape of the field of view of the camera 502 in a three-dimensional space 600, which approximates the area depicted in the map 500. In one example, as illustrated in FIG. 6, the electronic processor 305 utilizes the mounting height 601 of the camera 502 (relative to the ground level of the area), a pan value, a tilt value, and the aspect ratio of the camera 502 to calculate a three-dimensional model 602 for the field of view of the camera 502.

A three-dimensional representation has length, width, and height. A two-dimensional representation has only length and width. To display the three-dimensional field of view on a two-dimensional map, the electronic processor 305 must determine from where along the height of the three-dimensional representation it should take the length and width dimensions. An accurate representation of the three-dimensional model 602 of the field of view on the two-dimensional map 500 will accurately depict on the map the portion of the area that will be captured in the images. Accordingly, at block 408, the electronic processor 305 determines an intersection plane for the three-dimensional model 602. The intersection plane determines from where in the three-dimensional model 602 the two-dimensional representation of the field of view is produce. As illustrated in FIG. 6, the three-dimensional model exists in a three-dimensional space 600 relative to X, Y, and Z axes. In the example illustrated, the intersectional plane extends from a point (for example, point 603 as illustrated in FIG. 6) along the Z axis and is perpendicular to the Z axis. In some embodiments, two or more points in the three-dimensional space 600 are mapped to points in the real-world area depicted in the map 500, such that the three-dimensional model 602 describes a volume within the area.

In some embodiments, the intersection plane is based on the ground level for the area depicted by the map 500. As noted, in some embodiments, the objective of the camera deployment is to monitor for particular target objects or types of target objects. However, if a representation of the field of view were based solely on ground level, it is possible (for example, because of the camera's position and tilt angle) that certain types of objects would not be adequately visible in the images even though they are physically present in the field of view. For example, a human being present in the far side of a field of view might only be visible from the knees down in the captured images. If the goal of the camera placement were to monitor for intruders, this visibility would be inadequate. Accordingly, in some embodiments, the intersection plane is based on a target object height (in this example, the average height of a human being). Using this height increases the probability that the resulting representation of the field of view accurately reflects the portion of the area in which a human being, when present, would be adequately visible in the captured images. In one example, the electronic processor 305 receives a user input specifying a target object or target object type, including data specifying characteristics for the target object or target object height. In another example, the electronic processor 305 retrieves target object data from the database 204 (for example, as part of the data describing the area in which the camera is to be deployed).

Figure 7:
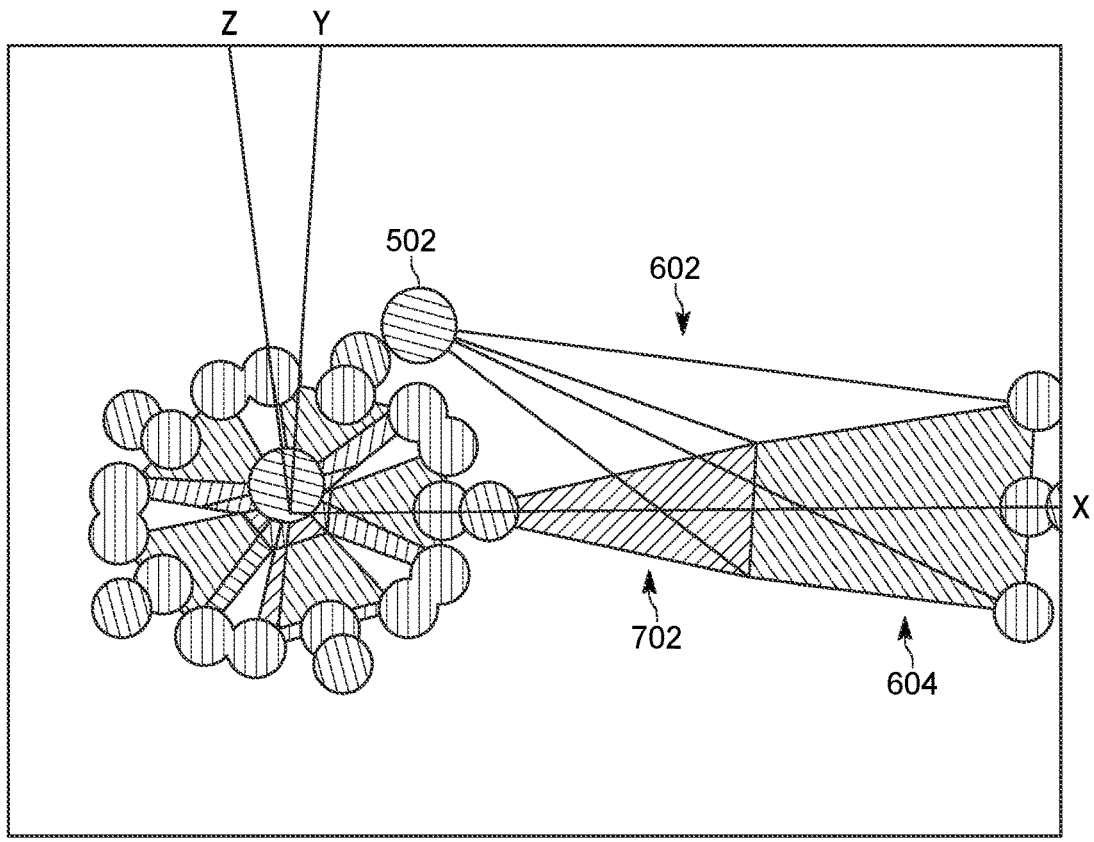
FIG. 7 is a diagram illustrating aspects of the execution of the method of FIG. 4 in accordance with some embodiments.

At block 410, the electronic processor 305 generates, based on the intersection plane, a two-dimensional slice of the three-dimensional model. For example, as illustrated in FIG. 6, the intersection plane that includes point 603 is projected through the three-dimensional model 602 to produce the two-dimensional slice 604. The two-dimensional slice 604 is representative of the field of view of the camera 502 within the area depicted in the map 500. FIG. 7 illustrates another view of the three-dimensional model 602 and the two-dimensional slice 604. As illustrated in FIG. 7, producing the two-dimensional slice 604 with the intersection plane also produces a dead zone 702, which represents a portion of the area that, while in front of the camera 502, is not captured by the images of the camera 502.

In some embodiments, the electronic processor 305 calculates a three-dimensional surface based on the topography of the area. The resulting three-dimensional surface is applied to the three-dimensional model 602 before applying an intersection plane to produce the two-dimensional slice 604. The resulting two-dimensional slice may include blank spaces caused by topological features, which block the camera from seeing portions of the area that might otherwise be visible were the surface of the area flat.

Figure 8:
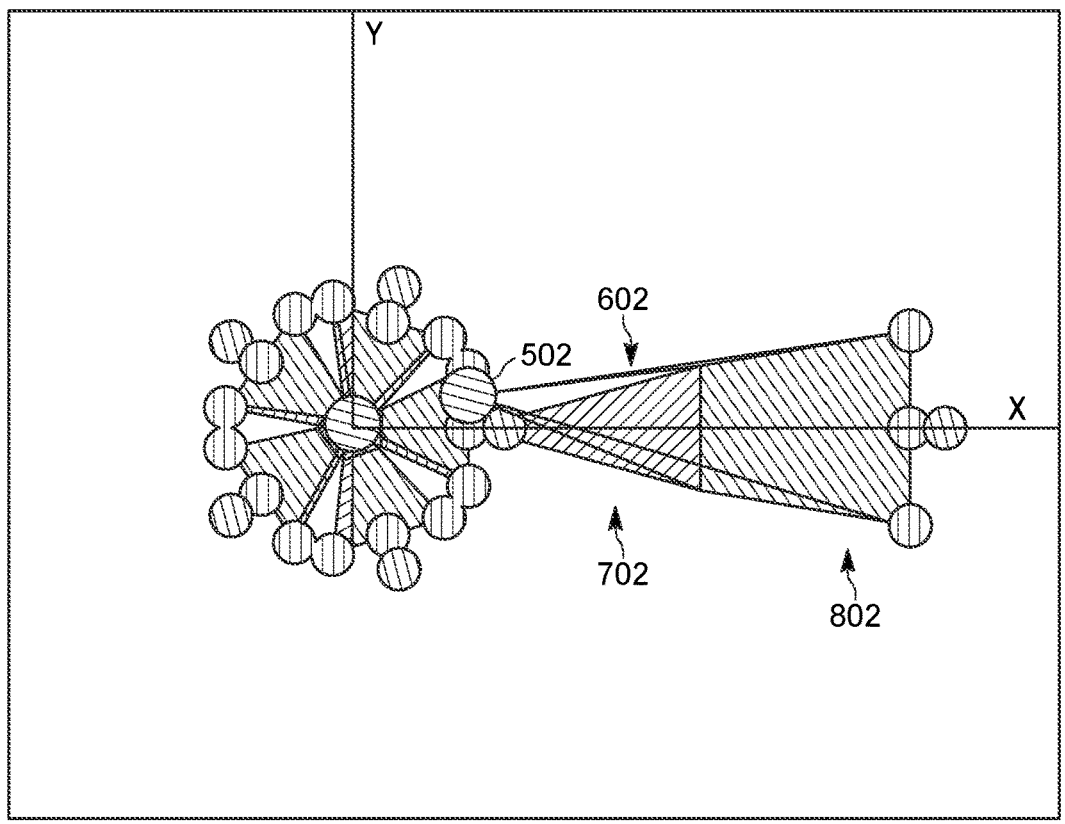
FIG. 8 is a diagram illustrating aspects of the execution of the method of FIG. 4 in accordance with some embodiments.

At block 412, the electronic processor 305 generates a first graphical representation 802 of the two-dimensional slice 604, as illustrated in FIG. 8. In some embodiments, the first graphical representation 802 is a top-down view of the two-dimensional slice 604. The shape of the first graphical representation 802 depends on the shape of the three-dimensional model 602. In the example illustrated in FIG. 8, the first graphical representation 802 is a polygon. In some embodiments, the first graphical representation 802 is an outline of the two-dimensional slice 604. In other embodiments, the first graphical representation 802 includes colors, shading, graphical patterns, levels of opacity, and the like. Variations in the appearance of the first graphical representation 802 may be used to associate the field of view it represents with the camera 502 or to indicate other characteristics of the camera or data associated with the field of view (for example, to indicate a pixel density as described herein). In some embodiments, the first graphical representation 802 is an animation, which may blink, pulse, alternate colors, or otherwise periodically change its appearance to represent characteristics or other data associated with the represented field of view.

Figure 9:
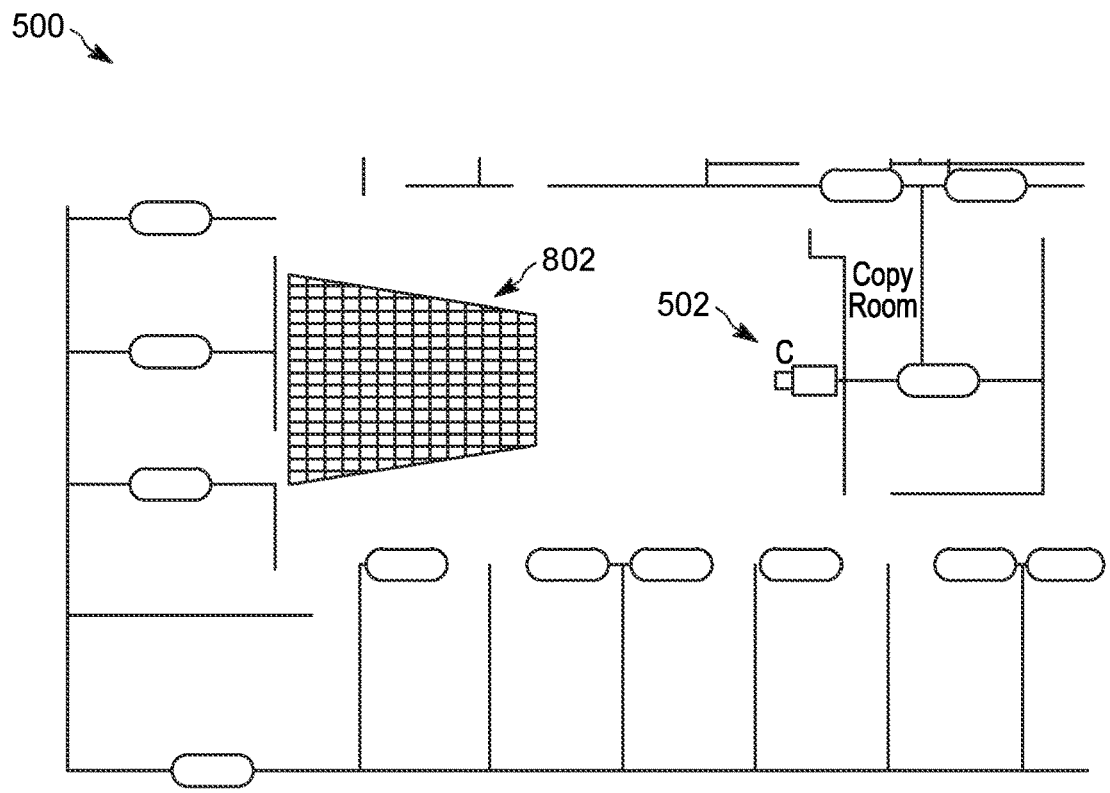
FIG. 9 illustrates an example graphical user interface generated using the method of FIG. 4 in accordance with some embodiments.

At block 414, the electronic processor 305 presents the first graphical representation 802 on the two-dimensional map 500. For example, the electronic processor 305 may use points within the three-dimensional space 600, which are mapped to points in the area represented by the map 500, to overlay the first graphical representation 802 on the two-dimensional map 500. In some embodiments, the first graphical representation 802 is presented on the two-dimensional map 500 by locating it at a distance from and angle relative to the camera 502, both calculated using the three-dimensional model 602. In some embodiments, the first graphical representation 802 is scaled based on a relative size difference between the three-dimensional model 602 and the map 500. As illustrated in FIG. 9, the first graphical representation 802 provides for a user of the system 200 an accurate representation of the field of view for the camera 502.

In some embodiments, features of the terrain of the area being monitored are taking into account. For example, the electronic processor 305 may provide, on the two-dimensional map, a second graphical representation of a terrain feature of the real-world area. A terrain feature may be an object located within the area (for example, furniture, partition walls, equipment, trees, infrastructure, and the like). A terrain feature may also be an aspect of the geography of the terrain (for example, a staircase in an indoor setting, a berm or other topographical feature in an outdoor setting, and the like).

Figure 10:
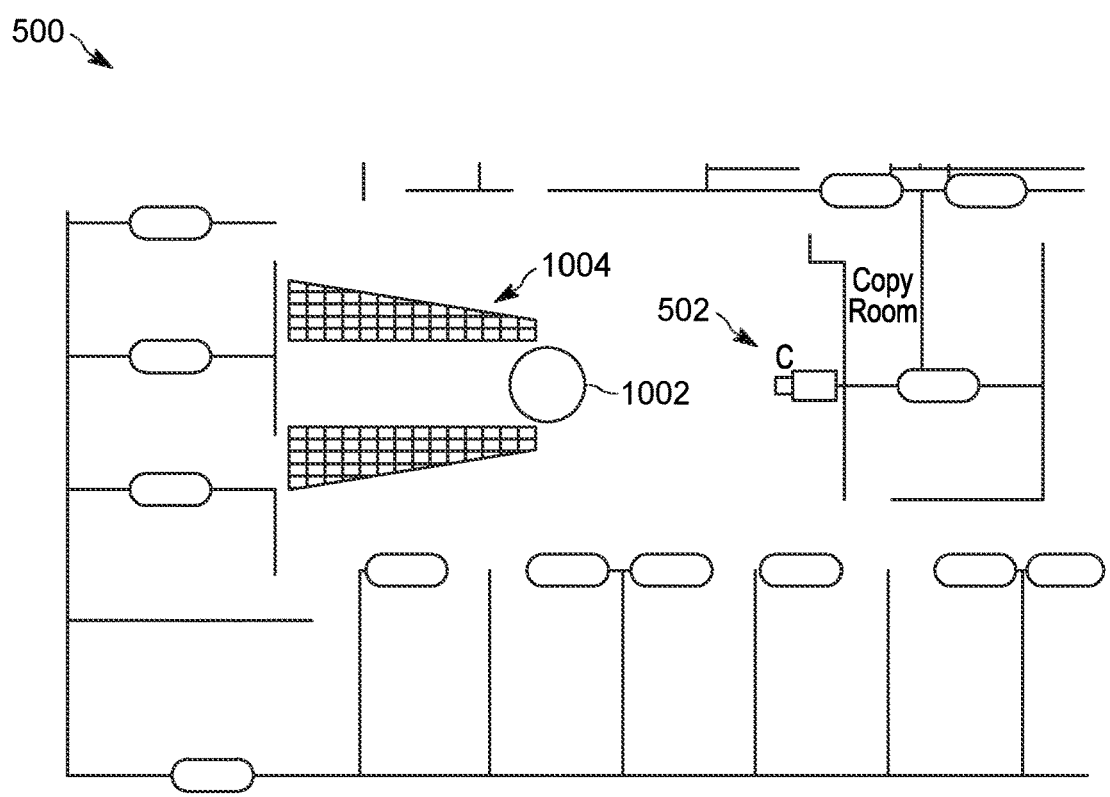
FIG. 10 illustrates an example graphical user interface generated using the method of FIG. 4 in accordance with some embodiments.

In the example illustrated in FIG. 10, a second graphical representation 1002 is presented. In such embodiments, the electronic processor 305 generates the three-dimensional model for the field of view based on at least one characteristic (for example, a length, a width, a height, and an opacity) of the terrain feature. Because the three-dimensional model is generated taking into account the terrain feature, the resulting field of view 1004 illustrated in FIG. 10 accurately represents the portion of the area that can be captured in images of the camera 502 in light of the terrain feature.

Figure 11:
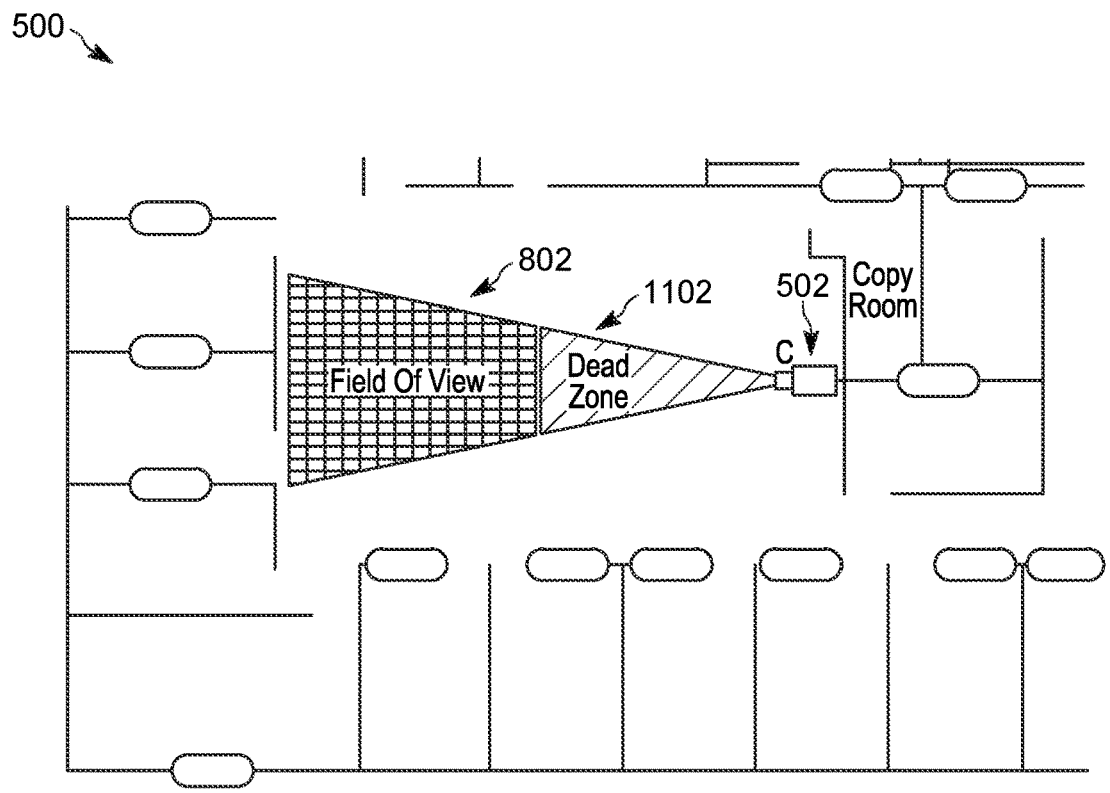
FIG. 11 illustrates an example graphical user interface generated using the method of FIG. 4 in accordance with some embodiments.

As noted above, the electronic processor 305 is capable of determining a dead zone 702 for the camera based on the two-dimensional slice and the three-dimensional model. In some embodiments, the electronic processor 305 generates a two-dimensional graphical representation of the dead zone and presents it on the two-dimensional map. For example, as illustrated in FIG. 11, both the first graphical representation 802 for the field of view and the two-dimensional graphical representation of the dead zone 1102 for the camera 502 are presented.

Figure 12:
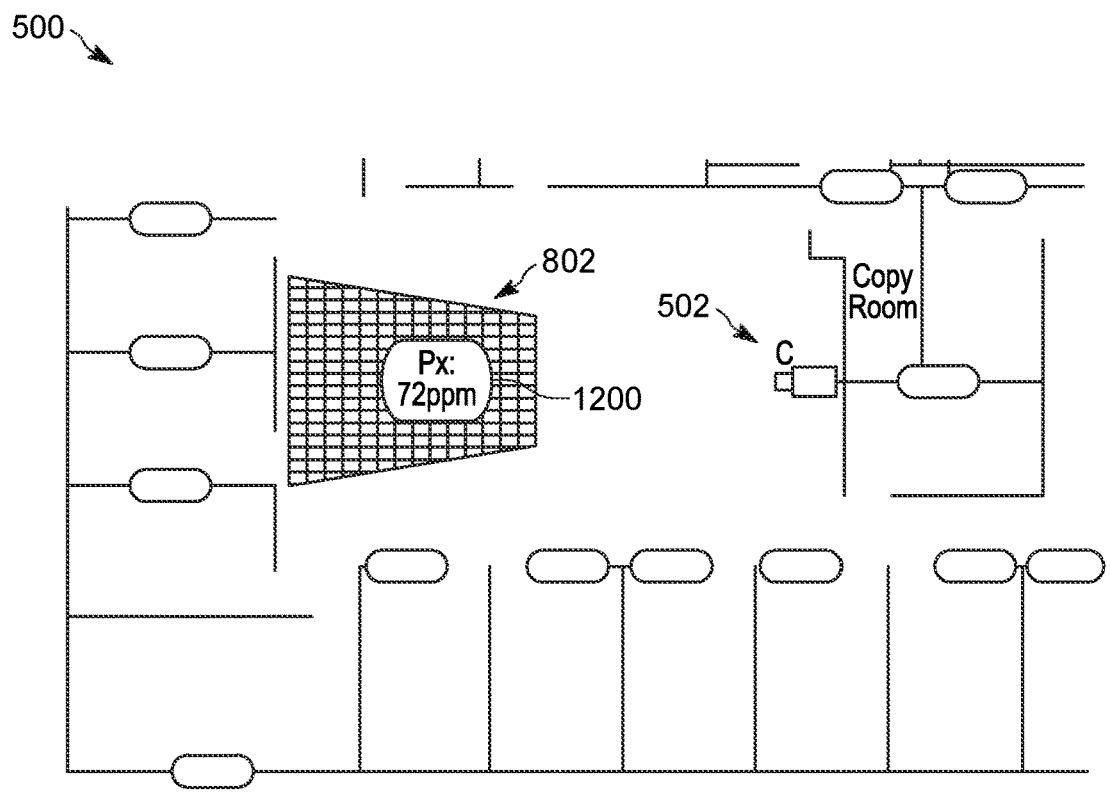
FIG. 12 illustrates an example graphical user interface generated using the method of FIG. 4 in accordance with some embodiments.

In some embodiments, the electronic processor 305 determines, based on the plurality of characteristics for the camera and the two-dimensional slice, a pixel density for the field of view. For example, the electronic processor 305 may determine based on the focal length and resolution of the camera, a pixel density at two-dimensional slice for the three-dimensional model. In some embodiments, the electronic processor 305 generates a second graphical representation of the pixel density and presents the second graphical representation on the two-dimensional map. For example, FIG. 12 illustrates a second graphical representation 1200 overlaid on the first graphical representation 802. In addition to a textual annotation overlay of the first graphical representation, other examples for the second graphical representation include a color overlay of the first graphical representation (for example, where different colors represent different ranges of pixel density), and a pattern of the first graphical representation (for example, where different patterns represent different ranges of pixel density).

Figure 13:
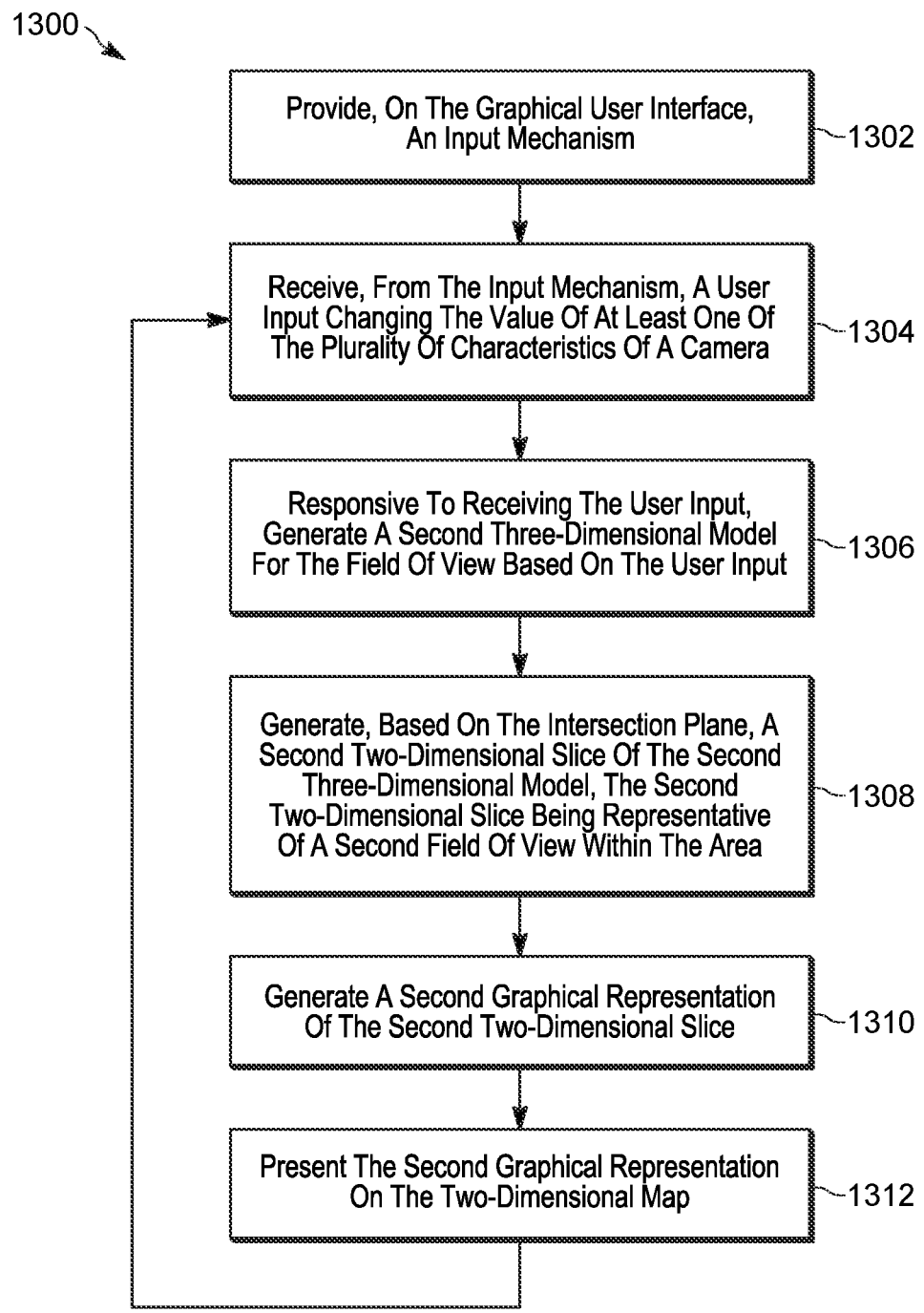
FIG. 13 is a flowchart illustrating a method for controlling some operations of the system of FIG. 2 in accordance with some embodiments.

An operator using the system 200 to plan a camera deployment may wish to experiment with options (for example, camera types, locations, mounting heights, and the like). An operator using the system 200 to monitor and control an existing camera deployment may want to understand how changing the pan, tilt, zoom, or another controllable characteristic will affect the camera's field of view and/or dead zone. Accordingly, FIG. 13 illustrates an example method 1300 for accurately representing a field of view of a camera within a real-world area in response to user inputs. Although the method 1300 is described in conjunction with the system 200 as described herein, the method 1300 could be used with other systems and devices. In addition, the method 1300 may be modified or performed differently than the specific example provided.

As an example, the method 1300 is described as being performed by the server 202 and, in particular, the electronic processor 305. However, it should be understood that, in some embodiments, portions of the method 1300 may be performed by other devices, including for example, the console 206. Additional electronic processors may also be included in the console 206 and/or server 202 that perform all or a portion of the method 1300. For ease of description, the method 1300 is described in terms of a single camera. However, the method 1300 may be applied to multiple cameras.

At block 1302, the electronic processor 305 provides, on the graphical user interface, an input mechanism. For example, the graphical user input may include a drop down menu, a slider bar, a series of radio buttons, or another suitable input for selecting from among a range of values corresponding to a camera characteristic.

At block 1304, the electronic processor 305 receives, from the input mechanism, a user input changing the value of at least one of the plurality of characteristics of the camera. In one example, a user moves a slider bar to adjust the pan of a camera. In another example, the user chooses from among several aspect ratios. In another example, a graphical representation of the camera itself (for example, an icon) is selectable or movable to adjust the height or location of the camera.

Responsive to receiving the user input, at block 1306, the electronic processor 305 generates a second three-dimensional model for the field of view based on the user input. The second three-dimensional model is generated similarly to the first three-dimensional model, but with the camera characteristics as modified by the user input.

At block 1308, the electronic processor 305 generates, based on the intersection plane, a second two-dimensional slice of the second three-dimensional model, the second two-dimensional slice being representative of a second field of view within the area, as described above with respect to the method 400.

At block 1310, the electronic processor 305 generates a second graphical representation of the second two-dimensional slice, as described above with respect to the method 400.

At block 1312, the electronic processor 305 presents the second graphical representation on the two-dimensional map, as described above with respect to the method 400.

In some embodiments, the input mechanism (of block 1302) is provided by presenting a graphical representation of the three-dimensional space 600 and the three-dimensional model 602 in a portion of the graphical user interface. In such embodiments, a user can provide input (for example, using various control elements provided in the graphical user interface) to change the position and other characteristics of the camera, the level of the intersection plane, aspects of the terrain, and the like, resulting in a dynamically changing three-dimensional model 602. In some embodiments, this portion of the graphical user interface is presented a separate window from the map 500. In such embodiments, changes made the three-dimensional model 602 are reflected on the map 500 by changes in the first graphical representation 802. Accordingly, a user is able to visualize how changes to a camera deployment affect the field of view and dead zone(s) for the camera.

In some embodiments, the graphical user interface allows a user to provide input adjusting the size, shape, and/or location of a two-dimensional field of view produced using the methods described herein (for example, the first graphical representation 802) to specify a desired field of view for a camera. For example, the graphical user interface may allow the user to manipulate edges or vertices of the first graphical representation 802. In some embodiments, the graphical user interface allows a user to provide input specifying the size, shape, and location of a desired two-dimensional field of view on a map. In response to receiving such inputs, the electronic processor 305 generates a three-dimensional model of the field of view, which would result in a two-dimensional field of view as specified by the user input. In some embodiments, the electronic processor 305 further determines a combination of camera characteristics (for example, location, height, aspect ratio, and focal length), which could produce such a three-dimensional model, and thus field of view specified by the user input.

The systems and methods described herein are configured to accurately represent, on a two-dimensional representation of a real-world area, a field of view of a camera within the real-world area. Using such embodiments, computing, video, and network resources can be efficiently and effectively used to monitor persons and property and to detect and prevent criminal activity.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for accurately representing a field of view of a camera within a real-world area, the system comprising:
   a transceiver;
   a display for displaying a graphical user interface; and
   an electronic processor communicatively coupled to the transceiver and the display;
   wherein the electronic processor is configured to:
   provide, on the graphical user interface, a two-dimensional map representing the real-world area;
   determine a plurality of characteristics for the camera;
   generate a three-dimensional model for the field of view based on the plurality of characteristics;
   determine an intersection plane for the three-dimensional model based on one of a ground level for the area and a target object height;
   generate, based on the intersection plane, a two-dimensional slice of the three-dimensional model, the two-dimensional slice being representative of the field of view within the area;
   generate a first graphical representation of the two-dimensional slice; and
   present the first graphical representation on the two-dimensional map.

2. The system of claim 1, wherein the electronic processor is configured to determine the plurality of characteristics of the camera by determining at least two selected from the group consisting of a location within the area, a pan value, a tilt value, a height relative to a ground level of the area, an aspect ratio, and a focal length.

3. The system of claim 1, wherein the electronic processor is configured to:
   provide, on the two-dimensional map, a second graphical representation of a terrain feature of the real-world area; and
   generate the three-dimensional model for the field of view based further on at least one characteristic of the terrain feature.

4. The system of claim 1, wherein the electronic processor is configured to:
   determine a dead zone for the camera based on the two-dimensional slice and the three-dimensional model;
   generate a two-dimensional graphical representation of the dead zone; and present the two-dimensional graphical representation of the dead zone on the two-dimensional map.

5. The system of claim 1, wherein the electronic processor is configured to:
   determine, based on the plurality of characteristics for the camera and the two-dimensional slice, a pixel density for the field of view;
   generate a second graphical representation of the pixel density; and
   present the second graphical representation on the two-dimensional map.

6. The system of claim 5, wherein the electronic processor is configured to generate the second graphical representation by generating one selected from the group consisting of a textual annotation overlay of the first graphical representation, a color overlay of the first graphical representation, and a pattern of the first graphical representation.

7. The system of claim 1, wherein the electronic processor is configured to:
   provide, on the graphical user interface, an input mechanism;
   receive, from the input mechanism, a user input changing the value of at least one of the plurality of characteristics of the camera;
   responsive to receiving the user input, generate a second three-dimensional model for the field of view based on the user input;
   generate, based on the intersection plane, a second two-dimensional slice of the second three-dimensional model, the second two-dimensional slice being representative of a second field of view within the area;
   generate a second graphical representation of the second two-dimensional slice; and
   present the second graphical representation on the two-dimensional map.

8. A method for accurately representing a field of view of a camera within a real-world area, the method comprising:
   providing, on a graphical user interface, a two-dimensional map representing the real-world area
   determining, with an electronic processor, a plurality of characteristics for the camera;
   generating, with the electronic processor, a three-dimensional model for the field of view based on the plurality of characteristics;
   determining with the electronic processor, an intersection plane for the three-dimensional model based on one of a ground level for the area and a target object height;
   generating, with the electronic processor, based on the intersection plane, a two-dimensional slice of the three-dimensional model, the two-dimensional slice being representative of the field of view within the area;
   generating, with the electronic processor, a first graphical representation of the two-dimensional slice; and
   presenting the first graphical representation on the two-dimensional map.

9. The method of claim 8, wherein determining the plurality of characteristics of the camera includes determining at least two selected from the group consisting of a location within the area, a pan value, a tilt value, a height relative to a ground level of the area, an aspect ratio, and a focal length.

10. The method of claim 8, further comprising:
    providing, on the two-dimensional map, a second graphical representation of a terrain feature of the real-world area; and
    generating the three-dimensional model for the field of view based further on at least one characteristic of the terrain feature.

11. The method of claim 8, further comprising:
    determining a dead zone for the camera based on the two-dimensional slice and the three-dimensional model;
    generating a two-dimensional graphical representation of the dead zone; and
    presenting the two-dimensional graphical representation of the dead zone on the two-dimensional map.

12. The method of claim 8, further comprising:
    determining, based on the plurality of characteristics for the camera and the two-dimensional slice, a pixel density for the field of view;
    generating a second graphical representation of the pixel density; and
    presenting the second graphical representation on the two-dimensional map.

13. The method of claim 12, wherein generating the second graphical representation includes generating one selected from the group consisting of a textual annotation overlay of the first graphical representation, a color overlay of the first graphical representation, and a pattern of the first graphical representation.

14. The method of claim 8, further comprising:
    providing, on the graphical user interface, an input mechanism;
    receiving, from the input mechanism, a user input changing the value of at least one of the plurality of characteristics of the camera;
    responsive to receiving the user input, generating a second three-dimensional model for the field of view based on the user input;
    generating, based on the intersection plane, a second two-dimensional slice of the second three-dimensional model, the second two-dimensional slice being representative of a second field of view within the area;
    generating a second graphical representation of the second two-dimensional slice; and
    presenting the second graphical representation on the two-dimensional map.

\* \* \* \* \*